(12) United States Patent
Pognant (10) Patent No.: US 12,063,125 B2
(45) Date of Patent: Aug. 13, 2024

(54) METHOD OF CONFIGURING A CENTRAL CONTROL UNIT BELONGING TO A HOME-AUTOMATION INSTALLATION

(71) Applicant: OVERKIZ, Metz-Tessi (FR)

(72) Inventor: Sylvain Pognant, Seynod (FR)

(73) Assignee: OVERKIZ, Metz-Tessi (FR)

( * ) Notice: Subject to any disclaimer, the term of this patent is extended or adjusted under 35 U.S.C. 154(b) by 1032 days.

(21) Appl. No.: 16/621,591

(22) PCT Filed: Jun. 7, 2018

(86) PCT No.: PCT/FR2018/051320
§ 371 (c)(1),
(2) Date: Dec. 11, 2019

(87) PCT Pub. No.: WO2018/229397
PCT Pub. Date: Dec. 20, 2018

(65) Prior Publication Data
US 2023/0051492 A1    Feb. 16, 2023

(30) Foreign Application Priority Data
Jun. 14, 2017   (FR) ..................................... 17/55374

(51) Int. Cl.
*H04L 12/28* (2006.01)
*H04L 41/0803* (2022.01)

(52) U.S. Cl.
CPC ...... *H04L 12/2816* (2013.01); *H04L 41/0803* (2013.01)

(58) Field of Classification Search
CPC .......... H04L 12/2816; H04L 41/0803
See application file for complete search history.

(56) References Cited

U.S. PATENT DOCUMENTS 6,314,459 B1   11/2001   Freeman
7,143,007 B2   11/2006   Long et al.
(Continued)

FOREIGN PATENT DOCUMENTS

WO    2018229396 A1    12/2018

OTHER PUBLICATIONS

International Search Report for Application No. PCT/FR2018/051320.
(Continued)

*Primary Examiner* — Charles R Kasenge
(74) *Attorney, Agent, or Firm* — CANTOR COLBURN LLP (57) ABSTRACT

The present disclosure relates to a method of configuring a central control unit belonging to a home-automation installation or a home-automation device including a central control unit and belonging to a home-automation installation, the method being implemented by the central control unit and including the following steps: Obtaining of a location identifier of a first remote configuration service; Dispatching of a configuration request destined for the first remote configuration service (Svclc) by using the location identifier and linked with an identifier of the central control unit; Reception of at least one set of data or of configuration instructions and/or of at least one identifier of a second functional remote service originating from the first remote configuration service (Svclc); Configuration on the basis of the at least one set of data or of configuration instructions and/or of the at least one identifier of a second functional remote service.

18 Claims, 3 Drawing Sheets

(56) References Cited

U.S. PATENT DOCUMENTS

| | | | |
|---|---|---|---|
| 8,539,567 B1* | 9/2013 | Logue | H04L 63/08 709/227 |
| 8,555,375 B2 | 10/2013 | Schofl et al. | |
| 8,635,373 B1* | 1/2014 | Supramaniam | H04L 67/1095 709/248 |
| 2003/0208622 A1 | 11/2003 | Mosier | |
| 2006/0159007 A1 | 7/2006 | Frutiger et al. | |
| 2007/0061430 A1* | 3/2007 | Kim | H04L 12/66 709/223 |
| 2007/0268516 A1 | 11/2007 | Bugwadia et al. | |
| 2008/0244043 A1 | 10/2008 | Kawai | |
| 2009/0088149 A1 | 4/2009 | Niimi et al. | |
| 2009/0319649 A1 | 12/2009 | Larsen et al. | |
| 2010/0034119 A1 | 2/2010 | Van Steen et al. | |
| 2010/0257584 A1 | 10/2010 | Meenan et al. | |
| 2010/0280635 A1 | 11/2010 | Cohn et al. | |
| 2011/0191769 A1 | 8/2011 | Brunet et al. | |
| 2012/0226367 A1 | 9/2012 | Tournier et al. | |
| 2012/0290137 A1* | 11/2012 | Raestik | G05B 19/042 700/276 |
| 2014/0347173 A1* | 11/2014 | Yamaguchi | G08C 17/02 340/12.28 |
| 2016/0026480 A1 | 1/2016 | Omori | |
| 2016/0050116 A1 | 2/2016 | Sheshadri et al. | |
| 2016/0127372 A1 | 5/2016 | Unterschuetz | |
| 2017/0054615 A1 | 2/2017 | Wilson et al. | |
| 2017/0097619 A1 | 4/2017 | Welingkar et al. | |
| 2017/0111247 A1 | 4/2017 | Uchiyama et al. | |
| 2017/0155545 A1 | 6/2017 | Baum et al. | |
| 2017/0156076 A1 | 6/2017 | Eom et al. | |
| 2017/0168469 A1 | 6/2017 | Marten et al. | |
| 2017/0171090 A1* | 6/2017 | Britt | H04L 12/2803 |
| 2017/0171165 A1* | 6/2017 | Britt | H04L 63/0428 |
| 2017/0181254 A1 | 6/2017 | Meitl et al. | |
| 2017/0264731 A1* | 9/2017 | Breton | H04W 4/80 |
| 2017/0371309 A1 | 12/2017 | Meruva et al. | |
| 2018/0173179 A1 | 6/2018 | Basterash | |
| 2018/0174440 A1 | 6/2018 | Hinode et al. | |
| 2019/0281118 A1 | 9/2019 | Kim et al. | |
| 2020/0252269 A1 | 8/2020 | Pognant | |
| 2021/0297279 A1 | 9/2021 | Pognant | |

OTHER PUBLICATIONS

Written Opinion for Application No. PCT/FR2018/051320.
International Search Report dated Aug. 3, 2018; International Application No. PCT/FR2018/051319; 3 pages (English).
International Search Report dated Aug. 3, 2018; International Application No. PCT/FR2018/051319; 4 pages (non-English).
94(3) Communication dated Dec. 15, 2020; EP Application No. 18735660.5; 2 pages (non-English).
94(3) Communication dated Dec. 15, 2020; EP Application No. 18735661.3; 2 pages (non-English).
Advisory Action with AFCP Decision dated Feb. 16, 2023; U.S. Appl. No. 16/621,596; 3 pages.
International Search Report dated Jul. 30, 2018; International Application No. PCT/FR2018/051320; 3 pages (English).
International Search Report dated Jul. 30, 2018; International Application No. PCT/FR2018/051321; 3 pages (English).
International Search Report dated Jul. 30, 2018; International Application No. PCT/FR2018/051321; 4 pages (non-English).
Opinion dated Nov. 13, 2017; FR Application No. 1755374; 5 pages (non-English).
Written Opinion Report dated Aug. 3, 2018; International Application No. PCT/FR2018/051319; 6 pages (non-English).
Opinion dated Oct. 18, 2017; FR Application No. 1755376; 5 pages (non-English).
Opinion dated Oct. 31, 2017; FR Application No. 1755373; 6 pages (non-English).
Search Report dated Nov. 13, 2017; FR Application No. 1755374; 2 pages (non-English).
Search Report dated Oct. 18. 2017; FR Application No. 1755376; 2 pages (non-English).
Search Report dated Oct. 31, 2017; FR Application No. 1755373; 2 pages (non-English).
US Final Office Action dated Nov. 17, 2022 for U.S. Appl. No. 16/621,596 (18 pages).
Written Opinion dated Jul. 30, 2018; International Application No. PCT/FR2018/051320; 5 pages (English).
Written Opinion dated Jul. 30, 2018; International Application No. PCT/FR2018/051321; 6 pages (English).
Written Opinion dated Jul. 30, 2018; International Application No. PCT/FR2018/051321; 8 pages (non-English).
Written Opinion Report dated Aug. 3, 2018; International Application No. PCT/FR2018/051319; 6 pages (English).
Final Office Action dated Apr. 26, 2023; U.S. Appl. No. 16/621,582, 38 pages.
Final Office Action dated Mar. 17, 2022; U.S. Appl. No. 16/621,582, 31 pages.
Final Office Action dated May 25, 2021; U.S. Appl. No. 16/621,582, 25 pages.
Non-Final Office Action dated Feb. 1, 2021; U.S. Appl. No. 16/621,582, 24 pages.
Non-Final Office Action dated Jul. 17, 2022; U.S. Appl. No. 16/621,582, 62 pages.
Non-Final Office Action dated Mar. 2, 2022; U.S. Appl. No. 16/621,596, 18 pages.
Non-Final Office Action dated Nov. 2, 2022; U.S. Appl. No. 16/621,582, 30 pages.
Notice of Allowance dated Mar. 16, 2023; U.S. Appl. No. 16/621,596, 9 pages.
Notice of Allowance dated Oct. 13, 2023; U.S. Appl. No. 16/621,596, 11 pages.

* cited by examiner

METHOD OF CONFIGURING A CENTRAL CONTROL UNIT BELONGING TO A HOME-AUTOMATION INSTALLATION

CROSS REFERENCE TO RELATED APPLICATIONS

This application is a National Stage of PCT Application No. PCT/FR2018/051320 filed on Jun. 7, 2018, which claims priority to French Patent Application No. 17/55374 filed on Jun. 14, 2017, the contents each of which are incorporated herein by reference thereto.

FIELD OF THE INVENTION

The present invention concerns a method for configuring at least one central control unit or a home automation device belonging to a home automation installation.

PRIOR ART

A home automation installation of a building may comprise one or several home automation device(s). It is known to proceed with the monitoring, that is to say the control and/or the supervision of said installation using a central control unit which communicates with one or several home automation device(s). Such a central control unit may be integrated to a home automation device or be independent.

A central control unit has to be configured to enable its interaction with the home automation device(s) or remote functional service(s), such as for example a user service.

A large number of different configurations may be considered for the same central control unit, which implies implementing a configuration method adapted in particular according to the devices or services to be connected, and following in an accurate manner the delivery of a unit thus configured up to a determined home automation installation to which corresponds this configuration, or proceeding with a configuration in situ during the set-up of the central control unit in the home automation installation, this configuration may turn out to be complex.

The in-factory configuration through a storage of the configuration in memory may be carried out during the production or by proceeding with a reprogramming at warehouse exit. Nonetheless, these operations imply specializing the production or warehouse exit process for a specific type of central control unit. This specialization makes this process complex and more expensive.

The present invention aims at solving all or part of the above-mentioned drawbacks.

DISCLOSURE OF THE INVENTION

To this end, the present invention concerns a method for configuring a central control unit belonging to a home automation installation or to a home automation device comprising a central control unit and belonging to a home automation installation, the method being implemented by the central control unit and comprising the following steps:
  Obtainment of a location identifier of a first configuration remote service;
  Sending a configuration request to the first configuration remote service using the location identifier and linked to an identifier of the central control unit;
  Reception of at least one set of configuration data or instructions and/or of at least one identifier of a second functional remote service originating from the first configuration remote service;
  Configuration on the basis of the at least one set of configuration data or instructions and/or of the at least one identifier of a second functional remote service.

Thanks to the arrangements according to the invention, the central control unit may be configured in a minimal or generic way during the distribution thereof. During the initial operation of this central unit, the adequate configuration is obtained from the configuration service. For example, these arrangements allow configuring the connection to a particular user service for control and/or supervision. They also allow proceeding with a geographical adaptation, to connect to different servers depending on the geographical area, with an adaptation of the communication frequency bands, to communicate in authorized frequency bands depending on the geographical area. It is also possible to proceed with a configuration of the functional offering of the central control unit or of the home automation device, or with the configuration of the human-machine interface. The configuration may also comprise a download of a software component or of a software component portion to be executed on the central control unit.

Thus, the referencing, the storage and the delivery logistics of the central control units is greatly simplified.

In the context of the present invention, a home automation device is a home automation equipment and/or a sensor, or else a portion of a home automation equipment or a portion of a sensor corresponding to a functional subset. A home automation device may also correspond to a control point of other home automation devices.

In the context of the present invention, an installation is a set comprising a plurality of home automation devices and at least one central control unit arranged within one single building or on a plurality of locations, each home automation device being connected to an electronic control unit among the plurality of electronic control units, the plurality of electronic control units forming a group under the control of a user. The electronic devices form groups of at least one home automation device attached to an electronic control unit.

In the context of the present invention, a central control unit of the home automation installation is an electronic unit comprising:
  at least one processing unit to contain and execute at least one computer program,
  at least one communication module intended for the monitoring and/or control of at least one home automation device; and
  at least one module for communication with the management unit.

The electronic unit may be independent from or integrated into a home automation device. In this last case, the communication module intended for the monitoring and/or control of the device may be a communication module internal to the home automation device and/or a communication module intended for the monitoring and/or control of other home automation devices. In some applications, a central control unit may communicate with the management unit through an intermediate management unit, for example a third-party service provider, whose intermediate management unit provides a service interface or API (standing for "Application Program Interface").

The central control unit may also be integrated to a router and/or a modem achieving a connection to a wide area network, in particular the Internet.

In the context of the present invention, a first configuration service is intended to identify the correct technical configuration for the home automation device or the considered central control unit and to communicate configuration information to the central control unit. In particular, the configuration service allows assigning a central control unit or a home automation device to a user service.

In the context of the present invention, a first subscription service allows proceeding with the subscription by a user of a central control unit or a home automation device to a user service. By user, it should be understood an end user, an installer or a maintenance operator. Alternatively, the subscription request may be directly emitted by the product during the initial operation thereof through a connection on this service.

These two first services will be described separately, but they may be confused and hosted by the same management unit or by distinct management units.

In the context of the present invention, a second service or functional service corresponds to a user service intended for the monitoring and/or control and/or supervision of the home automation installation by a user or by an application. The functional service is a remotely-accessible computerized service, which enables access to at last one control or supervision function of a home automation installation or of a home automation device, by means of a user interface or an application. The user interface may be accessible by a graphical interface, or through a programming interface.

According to an aspect of the invention, the management unit executing the first service is a server remotely connected to the at least one home automation installation via a wide area network. It should be noted that the term server is a logical designation which may cover the use of several physical servers to distribute the computer processing load to be carried out.

According to another aspect of the invention, the management unit(s) executing the first configuration and/or subscription service may be a central unit intended to be connected to one or several central control unit(s) on distinct private or local area networks, or else on the same local area network.

The management unit executing the second service is a service remotely connected to the management unit executing the first service. As before, the term server is a logical designation which may cover the use of several physical servers to distribute the computer processing load to be carried out.

The different mentioned services may be implemented by the same management unit, or by distinct management units.

The first services may be under the monitoring of a first entity and the second service may be under the monitoring of a second entity.

As example, the first entity may be an infrastructure or home automation installation management supplier, and the second entity may be a supplier of services related to the data or the control of home automation devices.

In general, the supervision corresponds to a supervision based on the processing of values of the state variables of at least one home automation device or one central control unit.

In the context of the present invention, a state variable is an element describing the state of a home automation device. The value of a state variable may correspond to the ON/OFF condition for a switch, or to an opening degree or percentage for a shutter. Moreover, a state variable may correspond to a measurement value of a sensor, for example a value of a physical or environmental quantity. The description of the states of the devices may be generic or specific, depending on the local protocol. The identifiers of the state variables may be numeric or alphanumeric. The values of the state variables may use formats or scales which are customized or proprietary.

In the context of the present invention, a command corresponds to an order that may be given to a home automation device or to a central control unit in order to carry out an action by a device or to obtain an information feedback, for example an information relating to a state variable of this device.

In the context of the present invention, a message is an information element notified or received via a communication module from an external equipment, or in the form of a synchronous or asynchronous call, which may also correspond to a local or remote function call.

According to an aspect of the invention, the obtainment of the location identifier is carried out by collecting this identifier in the memory of the central control unit. This identifier is stored in the memory during a pre-configuration, for example carried out in factory. Thanks to these arrangements, a minimum and uniform pre-configuration for a large number of central control unit is carried out, the remainder of the configuration being obtained on a case-by-case basis from the configuration service.

According to one implementation, the method comprises a prior step of plugging or initializing the central control unit.

This plugging/initialization may be triggered by an electric power supply or by an order originating at one step from an instruction of the user through a physical action on the central control unit such as a press on a button or a sending of instruction via a terminal.

According to an aspect of the invention, the sending of the configuration request may correspond to an attempt to connect to the configuration service. This connection attempt identifies the central control unit by the identifier.

According to an aspect of the invention, the method further comprises the following steps:
  Establishment of a communication to the functional service.

According to an aspect of the invention, a communication may correspond to a connection, whether permanent or not, or to the emission of information in a periodic or event-based manner According to an aspect of the invention, the method further comprises the following steps:
  Reception of at least one second set of configuration data or instructions originating from the second functional remote service;
  Complementary configuration on the basis of the second set of configuration data or instructions.

This configuration may correspond for example to a download of a software element, or to a complementary configuration of services.

The present invention also concerns a method for configuring a central control unit belonging to a home automation installation or a home automation device comprising a central control unit and belonging to a home automation installation, the method being implemented by a first configuration remote access service executed by a management unit and comprising the following steps:
  Reception of a configuration request originating from the central control unit linked to an identifier of the central control unit;
  Determination of at least one set of configuration data or instructions and/or of at least one identifier of a second functional remote service associated to the identifier of the central control unit in an assignment repository;

Sending a configuration message comprising the at least one set of configuration data or instructions and/or the at least one identifier of a second functional remote service.

According to an aspect of the invention, the method further comprises a step of sending configuration information.

According to an aspect of the invention, the method further comprises the following steps:

Reception of a registration request in connection with a unique identifier of the central control unit or of the home automation device comprising the central control unit and with a second functional service;

Registration in an assignment repository of an association between the central control unit or of its identifier linked to a functional service.

According to an aspect of the invention, the registration request is subsequent to a subscription request received linked to an identifier of a user account. According to one possibility, the subscription request originates from an end user. Alternatively, the subscription request may be directly emitted by the product during the initial operation thereof through a connection on the configuration service.

According to an aspect of the invention, the unique identifier may comprise for example a MAC address or a serial number. This identifier may be in the form of a QR code or another barcode optically readable on the central control unit or the device or the packaging thereof, or in the form of an RFID or NFC tag readable by a device available to the user, such as for example a mobile communication terminal.

According to an aspect of the invention, the subscription request comprises at least one option selection associated to the functional service.

According to an aspect of the invention, the registration step comprises a registration of complementary configuration information.

The registration may be requested by the first subscription service to the first configuration service. In this case, the subscription request may comprise a selection of functional service, the identifier of the central control unit. This request may also comprise a selection of service offering and possible configuration options. Afterwards, the configuration service may confirm the registration to the subscription service.

According to an aspect of the invention, the method further comprises the following step:

Subscription in a user repository of an association between the central control unit or its identifier linked to a user.

According to an aspect of the invention, the registration step comprises a registration of complementary configuration information.

According to one possibility, the subscription is operated by the second functional service.

Thus, the first subscription service sends a subscription request to the second functional service comprising the identifier of the central control unit, the identifier of the user. The request may also comprise a selection of service offering and possible configuration options.

The second service sends a confirmation of this subscription to the subscription service.

Afterwards, the first subscription service may confirm the subscription to the user through his terminal.

According to an aspect of the invention, the method further comprises the following step:

Check of the availability of the unique identifier before an assignment repository.

According to one possibility, the assignment repository is implemented by the first configuration service. The first subscription service may send a check request to this service. The result of the check is communicated to the first subscription service.

The recognition of the availability of the identifier is a requisite for the configuration of the central control unit. Otherwise, this means that the subscription request cannot be addressed because the central control unit is already associated to a service. In this case, a conflict concerning this identifier should be solved.

According to an aspect of the invention, the method further comprises the following step:

Check of the existence and of the rights of the user corresponding to the identifier before a user repository.

According to one possibility, a user repository is implemented by the second functional service. In these conditions, the first configuration or subscription service sends a check request to this service. The result of the check is communicated to the first service.

The recognition of the validity of the user account is a requisite for the configuration of the central control unit. Otherwise, this means that the subscription request cannot be addressed because the associated user account on the service is not valid or does not exist. Hence, a valid user account on this service should be determined before resuming the subscription.

The different non-incompatible aspects defined hereinabove may be combined.

BRIEF DESCRIPTION OF THE FIGURES

The invention will be better understood from the detailed description which is exposed hereinafter with reference to the appended drawing in which.

DESCRIPTION WITH REFERENCE TO THE FIGURES

In the following detailed description of the figures defined hereinabove, the same elements or the elements filling identical functions may preserve the same references so as to simplify the understanding of the invention.

Description of a System Comprising a Home Automation Installation

Figure 1:
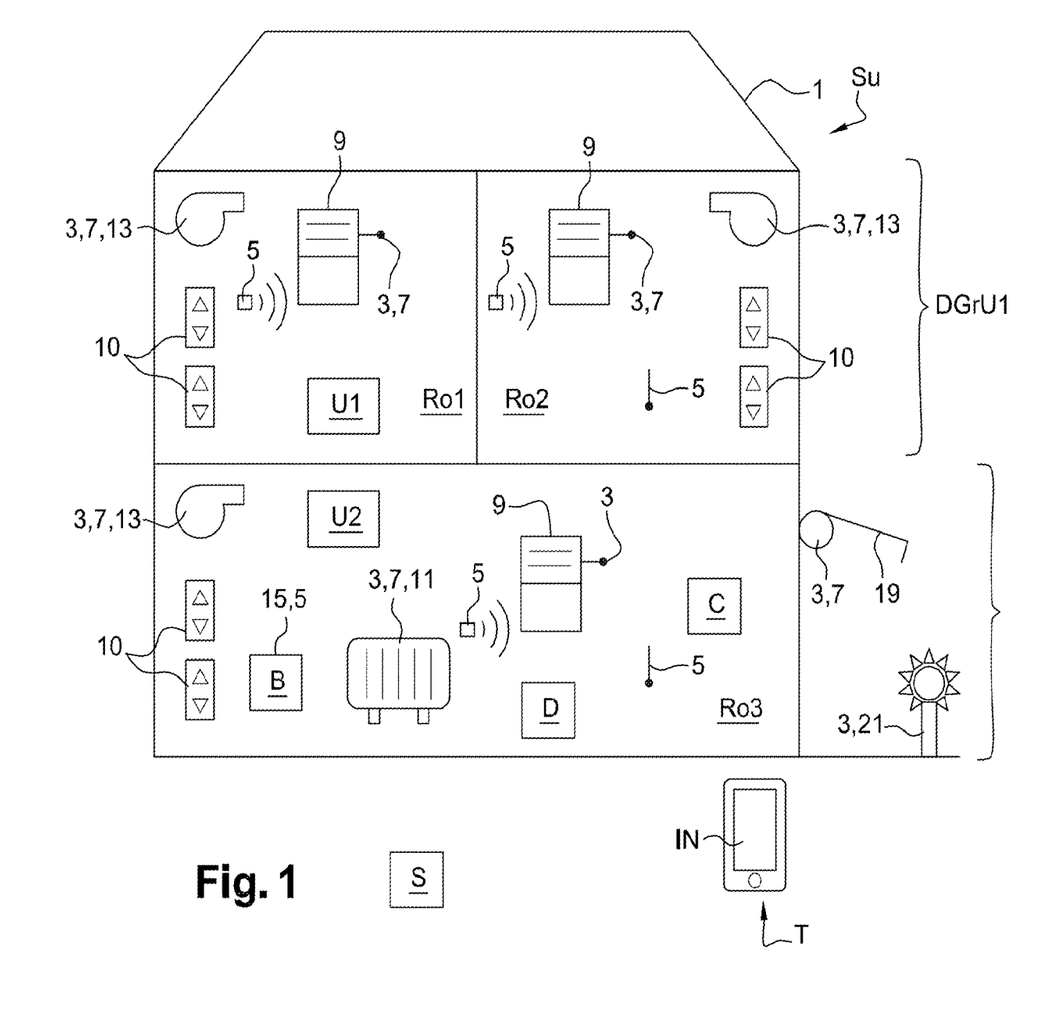
FIG. 1 is a schematic view of a building and of a home automation installation in accordance with an embodiment of the invention.

As illustrated in FIG. 1, a building 1 comprises for example three rooms Ro1, Ro2, Ro3. The building 1 also comprises home automation equipment 3 and sensors 5.

A home automation equipment 3 may consist of an actuator arranged to displace or set an element of the building 1, for example an actuator 7 for displacing a rolling shutter 9 or a terrace awning 19, or a regulation system 10 for a heater 11 or a ventilation system 13. A home automation equipment 3 may also consist of a lighting, for example a terrace external lighting 21 or a lighting control system, an alarm system, or still a video camera, in particular a video-surveillance camera.

The home automation installation Su may also comprise a control point 15 an actuator 7, such as a wireless control box B for the rolling shutter 9.

The home automation installation Su may comprise one or several sensor(s) 5, integrated to an actuator 7, to a control point 15 or to the control box B or independently of these elements. In particular, a sensor 5 may be arranged to measure a physical unit, for example a temperature sensor, an insolation sensor or a humidity sensor. Position sensors 5 of home automation equipment 3 of the building 1, such as, for example, sensors of the open state of a rolling shutter 9 or sensors of the position of a door leaf such as a window, whether motorized or not, may also be provided. The home automation installation may also comprise one or several presence sensor(s). The installation may also comprise one or several electric consumption sensor(s).

A home automation equipment 3 and a sensor 5 should thus be considered as units having information on observed actual states of elements of the building 1 and being capable of sharing this information with other elements of the home automation installation Su.

The home automation equipment 3 and the sensors 5 can thus have access to any measurable physical unit, such as the temperature of each room Ro1, Ro2, Ro3 or a state of an element of the building 1, such as the open state of a rolling shutter 9, the state of an alarm, etc.

In the following, we will use the home automation device or device D designation indifferently to designate sensors or home automation equipment, or parts of home automation equipment 3 or sensors 5.

In general, the home automation devices comprise a processing unit comprising a processor executing an embedded software. This software undergoes updates to improve the functions thereof or to proceed with corrections.

The home automation installation Su comprises a central control unit or a plurality of central control units U1, U2. In particular and as example, two central control units U1, U2 are represented in FIG. 1. According to one variant, a home automation installation may also comprise one single central control unit.

Each central control unit U1, U2 is arranged to control and/or monitor part of the devices D of the installation Su forming a group DGrU1, DGrU2. As example, in FIG. 1, the central control unit U1 is in charge of the devices D disposed in the rooms Ro1 and Ro2 of the first floor of the building, whereas the central control unit U2 is in charge of the devices D disposed in the room Ro3 on the ground floor of the building and the external devices.

In particular, the control and/or monitoring is carried out remotely, in particular using a wireless communication protocol, for example a radio communication protocol. Each central control unit U1, U2 is arranged to group together all data originating from the devices D of its group DGrU1, DGuU2 and to process these data.

Figure 2:
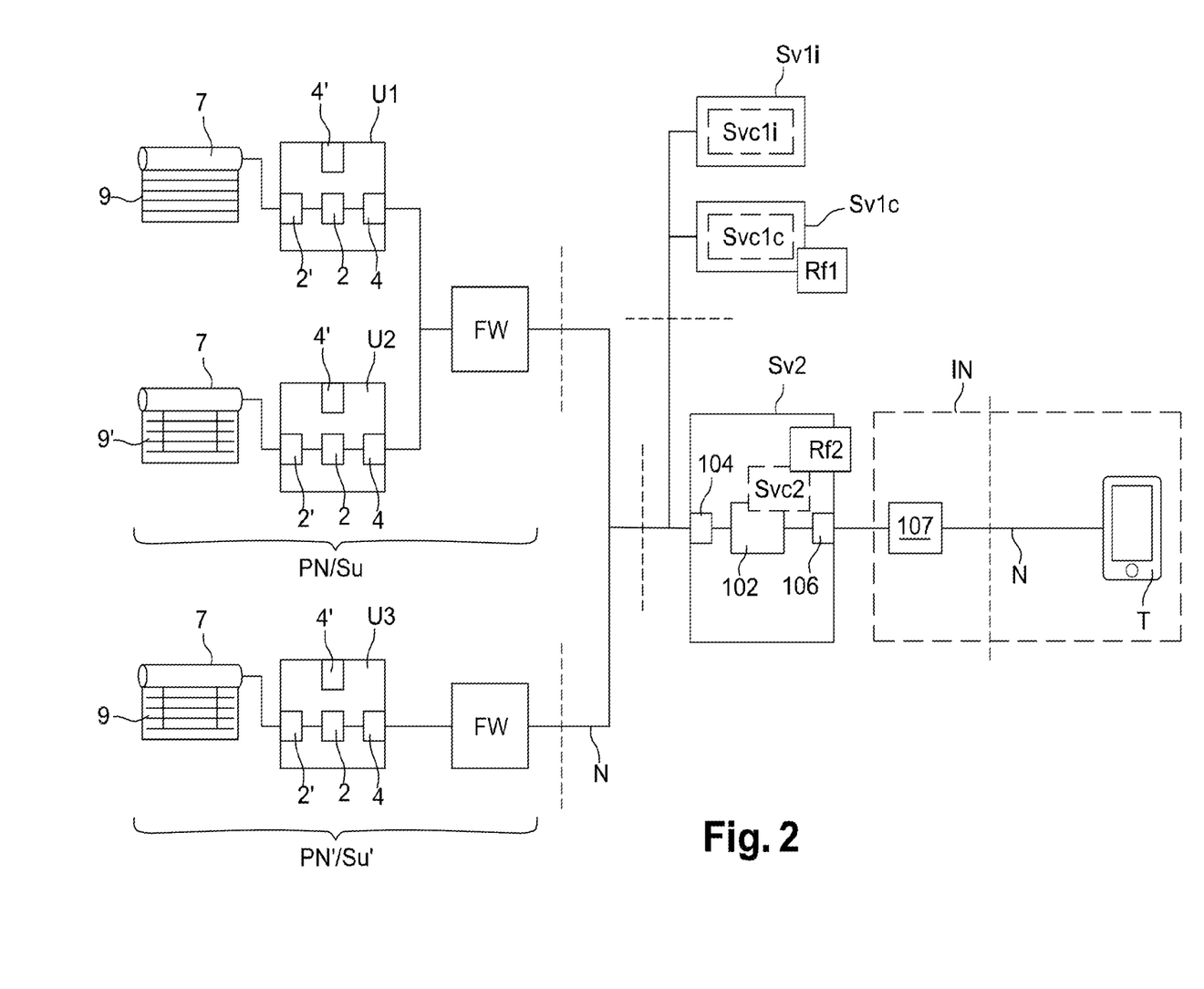
FIG. 2 is a diagram presenting an architecture of a system comprising the home automation installation illustrated in FIG. 1, a second home automation installation, as well as a plurality of servers intended to be connected to the home automation installations.

As represented in FIG. 2, each central control unit U is arranged to communicate with one or several remote server(s) Sv1*i*, Sv1*c*, Sv2.

The central control units U1, U2, U3 are disposed on a private network PN, PN', whose access is generally protected by a firewall FW. In particular, in the example represented in FIG. 2, two central control units U1, U2 are disposed on a first private network corresponding to a first home automaton installation, while a third central control unit U3 is disposed on a second private network PN', independent of the private network PN corresponding to a second home automation installation Su'. The private network PN is linked to a wide area network N, for example the Internet. We will describe in the following one of these units.

A central control unit U comprises a processing unit 2 arranged to contain and execute a first computer program. As example, the processing unit 2 comprises a processor, a storage flash memory as well as a random access memory, and an Ethernet chip.

The processing unit executes an embedded software. This software undergoes updates to improve the functions thereof or to proceed with corrections.

The central control unit U further comprises at least one communication module 2' intended to monitor and/or control home automation equipment 3 and/or sensors 5, the home automation equipment 3 may consist of actuators 7, lightings 21, an alarm system, or a video camera.

As example, as represented in FIG. 2, the communication module 2' enables the monitoring and control of at least one actuator 7, a movable element of the building 1, such as for example a rolling shutter 9, or an orientable sunshade 9' or other actuators 7 or lightings 21, as previously described with reference to FIG. 1, according to at least one local communication protocol.

As example, the communication module 2' may be arranged to implement for example one or more of the local first protocols P1 such as for example Z-Wave, EnOcean, io-Homecontrol, Somfy RTS, KNX, MODBUS, Wavenis, Philips HUE. In general, these local first protocols are non-IP local communication protocols.

According to another possibility, for example in the context of alarm systems, the central control unit may be integrated into the home automation device. According to still another possibility, the central control unit may also be integrated to a router and/or a modem achieving a connection to a wide area network, in particular the Internet.

When the central control unit is integrated to a home automation device, the communication module 2' intended for the monitoring and/or control of the device may be a communication module internal to the home automation device and/or a communication module intended for the monitoring and/or control of other home automation devices.

There is also provided the reception of information from a sensor 5 providing information on the presence of a user or values of the surrounding parameters such as temperature, humidity and luminosity. In the same manner, the central control unit U may enable the monitoring and/or control of an alarm system.

Each central control unit U may further comprise a communication module 4' for communicating according to a communication protocol other than the local first protocol. For example, the target second communication protocol may be a communication protocol above the IP protocol on a local area network, or else a generic point-to-point protocol. As example, the application protocol WEAVE using transport protocols 6lowpan and thread for a mesh network may constitute a second protocol. Other examples include Bluetooth, Zigbee or Wifi.

The communication terminal T may contain and execute an application software APP.

Each central control unit U further comprises a module 4 for communication with remote servers Sv1*i*, Sv1*c*, Sv2.

The server Sv enables the remote control and/or monitoring and comprises one or several processing unit(s) 102 arranged to contain and execute a second computer program.

In some applications, a central control unit U may communicate with the server Sv2 through an intermediate server, for example a third-party service provider, whose intermediate server provides a service interface or API. In turn, the server Sv2 comprises at least one communication interface 104 intended for the communication with the central control unit U.

The server Sv2 may also comprise a communication interface 106 intended for the communication with a control and/or monitoring interface IN enabling an end user Usr1 to remotely monitor the home automation installation, in particular via a functional service Svc2.

It should be noted that the term server is a logical designation which may cover the use of several physical servers to distribute the computer processing load to be carried out.

For example, the control and/or monitoring interface IN comprises a web server 107 and a mobile communication terminal T communicating via the wide area network N. For example, the mobile communication terminal T may consist of a smartphone or a tablet. The mobile communication terminal T may be the same or a terminal of the same type as that with which the central control unit U communicates locally by means of the communication module 4', or a different terminal. We will designate these mobile terminals indifferently by the reference T. Alternatively, the end user may also use a stationary terminal.

The control and/or monitoring interface IN comprises a processor which may be disposed at the level of the web server 107 and/or the mobile communication terminal T.

The processor of the control and/or monitoring interface IN is arranged to use a third computer program. In turn, this third computer program is arranged to execute a downloadable application.

The mobile communication terminal T comprises a data input device and a display device, for example in the form of a tactile control portion of a screen of the terminal T and in the form of one or several button(s) of the terminal T.

The Server Sv2 may also use the communication interface 104 or another interface for the communication with another server or several servers Sv1$i$ and Sv1$c$ for subscription and configuration implementing subscription and configuration services Svc1$i$ and Svc1$c$ that we will describe later on.

This interface enables the communication between the servers Sv1$i$, Sv1$c$ and Sv2 on a local or wide area network, for example the Internet.

The servers Sv1$c$ and Sv1$i$ may take on the same architecture as the server Sv2.

Unique Identifier of a Home Automation Device

The servers Sv2, Sv1$i$ and Sv1$c$, the services Svc1$i$, Svc1$c$ and Svc2 as well as the central control units U may use a unique identifier to identify the home automation devices. The structure of a unique identifier of a home automation device DURL will now be described in connection with a particular embodiment.

According to this embodiment, the unique identifier of a home automation device comprises information on:

The local native protocol of the home automation device D;

The communication path to the device D, including the intermediate central control units U and the termination addresses to cross, whether organized or not in a hierarchical topology;

A subsystem identifier subsystemId if the device belongs to a group of devices D associated to the same address. The devices that are a unique expression of an address have no extension for identifying a subsystem.

Thus, the form of the unique identifier of a device DURL may be as follows:

<protocol>://<gatewayId>/<rawDeviceAddress>(#<subsystemId>)

Wherein the following fields are present:

protocol: identifier of the native device local protocol.

gatewayId: identifier of the first central control unit U, for example a serial number or a unique identifier.

rawDeviceAddress: a simple or multi-level path. Its meaning and its format depend on the addressing scheme of the local communication protocol of the device D.

subsystemId: this optional field indicates an identification, for example a rank of the subsystem (starting for example at 1), if such a subsystem is present.

EXAMPLES 1) knx://0201-0001-1234/1.1.3

This unique identifier DURL corresponds to a device D communicating by the KNX procotol with an individual address 1.1.3 accessible to the central control unit U carrying the identifier #0201-0001-1234.

2) io://0201-0001-1234/145036 #2

This unique identifier GDURL corresponds to a subsystem carrying the number 2 associated to a device D communicating by the io-Homecontrol protocol with a radio address 145036 accessible to the central control unit U carrying the identifier #0201-0001-1234.

First Subscription and/or Configuration Service and Second Service

The first configuration service Svc1$c$ is intended to identify the correct technical configuration for the home automation device or the considered central control unit and to communicate configuration information to the central control unit. In particular, the configuration service Svc1$c$ allows assigning a central control unit or a home automation device to a user service.

The first subscription service Svc1$i$ allows proceeding with the subscription by a user of a central control unit or a home automation device to a user service. By user, it should be understood an end user, an installer or a maintenance operator. Alternatively, the subscription request may be directly emitted by the central control unit U or the home automation device D comprising the central control unit U during the initial operation thereof through a connection on this service Svc1$i$.

These two first services Svc1$c$ and Svc1$i$ will be described separately, but they may be confused. These two first services may be hosted by the same server or group of servers or by distinct servers or groups of servers Sv1$i$ and Sv1$c$ as described as example in FIG. 2.

The second service or functional service Svc2 corresponds to a user service intended for the monitoring and/or control and/or supervision of the home automation installation by a user or by an application. The functional service is a remotely-accessible computerized service, which enables access to at last one control or supervision function of a home automation installation or of a home automation device, by means of a user interface or an application. The user interface may be accessible by a graphical interface, or through a programming interface.

The service Sv2 may be implemented by the same server as the first services, or by another server or group of servers Sv2, as described as example in FIG. 2.

The first services Svc1$i$, Sv1$c$ may be under the monitoring of a first entity and the second service Svc2 may be under the monitoring of a second entity.

As example, the first entity may be an infrastructure or home automation installation management supplier, and the second entity may be a supplier of services related to the supervision or the control of home automation devices.

Assignment Repository

The first configuration service Svc1$c$ implements an assignment repository R1. The assignment repository R1 stores the correspondence between an identifier of a central control unit U and an identifier of a second functional service Svc2. The Table 1 below provides an example of a first data structure of the repository R1. This repository may also comprise optional configuration information.

TABLE 1

Example of a second data structure of the repository Rf

| Identifier of the central control unit UID | Identifier of the functional service | Optional specific configuration cfg |
|---|---|---|
| UID1 | Svc2ID1 | Cfg11 |
| UID2 | Svc2ID2 | Cfg12 |

As example, the repository may be constituted by a data base or a depository service. This repository may be comprised in the first configuration service Svc11 or external and accessible by the first configuration service Svc11.

User Repository

In order to define the configuration that has to be applied to a central control unit U, the second functional service Svc2 may use a repository Rf2, which may be comprised in the assignment repository or distinct, but still accessible by the second functional service Svc2.

The user repository Rf2 comprises associations between an identifier of a central control unit UID, an identifier of a user account USrID, and possibly a specific functional configuration cfgF. An example of a definition table contained in the user repository Rf2 is represented hereinbelow in Table 2.

TABLE 2

Example of a definition table in the repository Rf2

| Identifier of the central control unit UID | Identifier of the user USrID | Optional specific functional configuration cfg2 |
|---|---|---|
| UID1 | UsrID1 | Cfg21 |
| UID2 | UsrID2 | Cfg22 |

Configuration Method

First Embodiment

Figure 3:
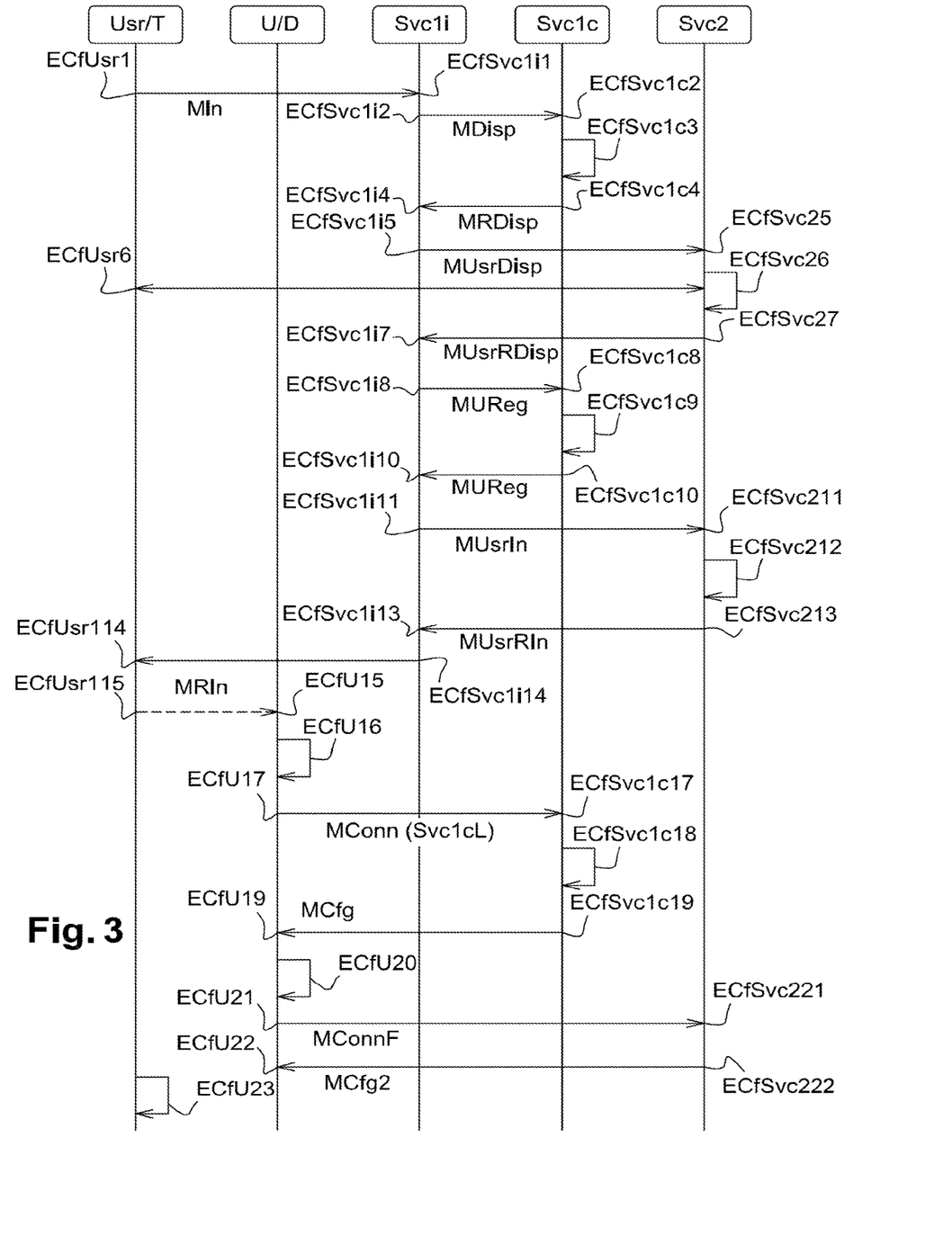
FIG. 3 is a diagram illustrating an implementation of a configuration method.

We will now describe a method for configuring a remote access to at least one home automation device D belonging to a home automation installation Su with reference to FIG. 3.

In an initial state, the user Usr has made the acquisition or obtained a home automation device D and/or a central control unit U.

The home automation device D or the central control unit U contains at least one location identifier Svc1$c$L corresponding to an information related to the address of the service Svc1$c$.

According to one variant, the central control unit U may contain a plurality of services Sv1$c$ accessible according to the geographical area. In these conditions, the central control unit may attempt to enter into communication successively with these services.

However, the home automation device D or the central control unit U has no information related to the functional service Svc2. Moreover, the configuration of the central control unit U or of the home automation device D may be incomplete with regards to:
- the technical configuration;
- all or part of its software;
- the connectivity to the server,
- its behavior;
- the functional or commercial offerings to be implemented.

In a prior step, the service Svc1 obtains a list of the possible services SvC2, as well as the address of the service Sv1D, as well as a catalog of services offerings.

At a step ECfUsr1, the end user Usr emits a subscription request Min before the service Svc1$i$ which receives this request at a step ECfSvc1$i$1. In particular, the subscription request comprises a unique identifier UID of the central control unit U. This unique identifier UID may for example comprise a MAC address or a serial number. This identifier may be in the form of a QR (or QR-Code, standing for "Quick Response Code") code or another on or two dimension barcode optically readable on the central control unit U or the device D or their packaging, or in the form of a radio frequency identification tag (or RFID, standing for "Radio Frequency IDentification"), a near field communication tag (or NFC, standing for "Near Field Communication") or any other tag readable by a device available to the user, such as for example a mobile communication terminal T.

The subscription request also comprises the identifier UsrID of the user if the user has a user account. The subscription request also comprises a service selection to associate to the central control unit U. The subscription request may also comprise at least one option selection. As example, the options may correspond: to the number and to the nature of the home automation communication protocols or others that are activated; to the activation, or not, of a feedback of values from a sensor for data logging on the management unit; to a setting of a limit on the number of home automation devices that can be paired.

The service Svc1$i$ proceeds with a check of the availability of the unique identifier UID before an assignment repository Rf1. According to one possibility, this repository Rf1 is implemented by a configuration and distribution service Svc1$c$. In these conditions, the subscription service Svc1$i$ sends a check request at a step ECfsvc1$i$2.

The configuration service Sv1$c$ receives the request MDisp at a step ECfSvc1$c$2 and proceeds with the check at a step ECfSvc1$c$3. The result of the check MRDisp is communicated to the service Svc1$i$ at a step EcfSvc1$c$4, which receives it at a step ECfSvc1$i$4. In this case, we will suppose that the availability of the identifier UID has been recognized. Otherwise, this means that the subscription request cannot be addressed because the central control unit is already associated to a service. Hence, a conflict concerning this identifier should be solved.

To the extent that the availability of the identifier UID is confirmed, the service Sv1$i$ proceeds with a check of the existence and of the rights of the user Usr corresponding to the identifier UsrID before a user repository Rf2. According to one possibility, this repository Rf2 is implemented by the functional service Svc2. In these conditions, the subscription service Svc1 sends a check request at a step ECfsvc1$i$5.

The considered service Svc2 receives the request MUsrDisp at a step ECfSvc25 and proceeds with the check at a step ECfSvc26. The result of the check MUsrRDisp is communicated to the service Svc1 at a step EcfSvc27, which receives it at a step ECfSvc1i7.

If a user account for the user Usr does not exist yet, a user account creation step may be carried out at this level. If it already exists, the check of the user account may comprise a request for a password from the user, as represented at step ECfUsr6.

In this case, we will suppose that the availability of the identifier Usr has been recognized. Otherwise, this means that the subscription request cannot be addressed because the associated user account associated on the service is not valid. Hence, a valid user account on this service should be determined before resuming the subscription.

To the extent that the validity of the user account and of the identifier is confirmed, the service Svc1i proceeds with a step of registering the service Svc2. According to one possibility, this registration is operated by the configuration service Svc1c.

Thus, at a step EcfSvc1i8, the service Svc1i sends a registration request MReg to the configuration service Svc1c comprising a functional service selection Svc2, for example Samsung IoT or Google IoT, the identifier of the central control unit UID, a service offering selection and possible configuration options. The configuration service Svc1c receives this request at a step ECfSvc1c8.

At a registration step ECfSvc1c9, the service Svc1c proceeds with the registration in the assignment repository Rf1 of an association between the central control unit U or its identifier UID linked to a functional service Svc2 and possibly with complementary configuration information Cfg1.

The service Svc1c sends a confirmation MRUIn of this subscription at a step ECfSvc1c10 to the service Svc1i which receives it at a step ECfSvc1i10.

Afterwards, the service Svc1i proceeds with a subscription of the service Svc2. According to one possibility, this subscription is operated by the functional service Svc2.

Thus, at a step EcfSvc1i11, the service Svc1i sends a subscription request MUsrin to the functional service Svc2 comprising: the identifier of the central control unit UID, the identifier of the user UsrID, a service offering selection and possible configuration options. The functional service receives this request at a step ECfSvc211.

At a configuration/subscription step ECfSvc212, the service Svc2 proceeds with the subscription in the user repository Rf2 of an association between the central control unit U or of its identifier UID linked to a user Usr and possibly to complementary functional configuration information Cfg2.

The service Svc2 sends a confirmation MRUsrin of this subscription at a step ECfSvc213 to the service Svc1i which receives it at a step ECfSvc1i13.

Afterwards, the service Svc1i may confirm the subscription to the user Usr through his terminal at a step EcfSvc1i14, the confirmation being received at a step EcfUsrl14.

Next, it is proceeded with a plugging or initialization of the central control unit U at a step ECfU15. This plugging/initialization may be triggered by an electric power supply or by an order, at a step EcfUSr115, originating from an instruction of the user through a physical action on the central control unit U such as a press on a button or a sending of instruction via a terminal T. In the context of this plugging or following this initialization, the central unit obtains, at a step EcfU16, the location identifier Svc1cL of the configuration service which may correspond to a URL, this identifier having been stored beforehand, for example in factory, in the memory of the central control unit U.

Afterwards, the central control unit U proceeds, at a step EcfU17, with an attempt to connect to the configuration service SV1c using the location identifier Svc1cL. This connection attempt MConn identifies the central control unit by the identifier UID. This connection attempt corresponds to a configuration request. Of course, several successive steps may be carried out corresponding to the establishment of a communication, and then to the configuration request.

When the plugging of the central control unit is performed before the subscription having been carried out, the service Svc1c may indicate to the central control unit U that it cannot proceed with the configuration. In this case, the central control unit U may proceed with requests periodically.

On reception of this configuration request at a step EcfSvc1c17, the service Svc1c proceeds with a check at a step ECfSvc1c18 in the assignment repository Rf1 in order to determine whether the identifier UID is actually assigned, and which are the associated data. In particular, the service Svc1c may determine an associated functional service Svc2 and the associated connection information, but also possible configuration information Cfg1.

Afterwards, the service Svc1c may send back one or several configuration message(s) MCfg at a step ECfSvc1c19 which are received by the central control unit U at a step ECfU19.

At a step ECfU20, the central control unit U proceeds with its configuration on the basis of the information received from the service in the message MCfg, and in particular with the registration of the connection data concerning the functional service Svc2 and other configuration elements Cfg1.

For example, the identifier of a second remote functional service may correspond to: a host name or IP address of the service; a port number to be used; a protocol to be used, for example HTTPS or COAP.

The other configuration information in the set of configuration data Cfg1 may comprise: an adaption of the frequency band, in particular depending on the geographical position; an authorization of the use of determined communication protocols; the loading of software components, for example particular drivers; the update, possibly depending on the geographical area; or else the configuration of the graphical interface, comprising for example the download of a logos/icons or software components to modify the appearance or the behavior of a display.

At a step EcfU21, the central control unit U proceeds with the establishment of a connection MConnF, whether permanent or not, or with the emission of information in a periodic or event-based manner to the functional service Svc2 which receives the corresponding information at a step ECfSvc221.

According to one possibility, at a step ECfU22, the central control unit U proceeds with a complementary configuration on the basis of a configuration portion Cfg2 originating from the functional service Svc2 which provides this configuration at a step EcfSvc222.

This configuration may correspond for example to a download of a software element, or to a complementary configuration of services.

At a step ECfUsr23, according to one possibility, the user may start using the service Svc2.

According to one possibility, a reset of the central control unit U may be provided for. In this case, a notification step may be carried out before the subscription service Svc1i in order to reset the repositories Rf1 and Rf2, respectively via the services Svc1c and Svc2. Afterwards, the central control unit U can be used again in a different configuration, based on the selections communicated by the user.

The invention claimed is:

1. A method for configuring a central control unit belonging to a home automation installation, the method being implemented by the central control unit and comprising the following steps:
   obtainment of a location identifier of a first configuration remote service;
   sending a configuration request to the first configuration remote service using the location identifier of the first configuration remote service, the configuration request being linked to an identifier of the central control unit;
   reception, from the first configuration remote service, of at least one set of configuration data of the central control unit and of at least one identifier of a second functional remote service;
   configuration on the basis of the at least one set of configuration data of the central control unit and of the at least one identifier of a second functional remote service, wherein the at least one set of configuration data of the central control unit comprises an adaptation of a frequency band on which the central control unit communicates.

2. The configuration method according to claim 1, further comprising the following step:
   establishment of a communication to the second functional remote service.

3. The configuration method according to claim 2, further comprising the following step:
   reception of at least one second set of configuration data of the central control unit originating from the second functional remote service;
   complementary configuration on the basis of the at least one second set of configuration data of the control unit.

4. A method for configuring a central control unit belonging to a home automation installation, the method being implemented by a first configuration remote access service executed by a management unit and comprising the following steps:
   reception, from the central control unit, of a configuration request linked to an identifier of the central control unit;
   determination of at least one set of configuration data of the central control unit and of at least one identifier of a second functional remote service, the at least one set of configuration data of the central control unit and the at least one identifier of a second functional remote service being associated to the identifier of the central control unit in an assignment repository;
   sending, to the central control unit, of a configuration message comprising the at least one set of configuration data of the central control unit and the at least one identifier of a second functional remote service, for the central control unit to proceed with its configuration, wherein the at least one set of configuration data of the central control unit comprises an adaptation of a frequency band on which the central control unit communicates, or an authorization of a use of determined communication protocols by the central control unit.

5. The configuration method according to claim 4, further comprising the following steps:
   reception of a registration request in connection with the identifier of the central control unit and with the at least one identifier of a second functional remote service, and with the at least one set of configuration data of the central control unit;
   registration in the assignment repository of an association between the identifier of the central control unit and the at least one identifier of the second functional remote service and the at least one set of configuration data of the central control unit.

6. The configuration method according to claim 5, further comprising the following steps:
   check, with the assignment repository, of the availability of the identifier of the central control unit.

7. The configuration method according to claim 6, further comprising the following steps:
   check, with a user repository, of the existence and of rights of a user associated with the identifier of the central control unit.

8. The configuration method according to claim 5, further comprising the following steps:
   Subscription, in a user repository, of an association between the identifier of the central control unit and a user.

9. The configuration method according to claim 8, further comprising the following steps:
   check, with the assignment repository, of the availability of the identifier of the central control unit.

10. The configuration method according to claim 8, further comprising the following steps:
    check, with a user repository, of the existence and of rights of the user associated with the identifier of the central control unit.

11. The configuration method according to claim 9, further comprising the following steps:
    check, with a user repository, of the existence and of rights of the user associated with the identifier of the central control unit.

12. The configuration method according to claim 5, further comprising the following steps:
    check, with a user repository, of the existence and of rights of a user associated with the identifier of the central control unit.

13. The configuration method according to claim 4, further comprising the following steps:
    subscription in a user repository of an association between the identifier of the central control unit and a user.

14. The configuration method according to claim 13, further comprising the following steps:
    check, with the assignment repository, of the availability of the identifier of the central control unit.

15. The configuration method according to claim 14, further comprising the following steps:
    check, with a user repository, of the existence and of rights of the user associated with the identifier of the central control unit.

16. The configuration method according to claim 13, further comprising the following steps:
    check, with a user repository, of the existence and of rights of the user associated with the identifier of the central control unit.

17. The configuration method according to claim 4, further comprising the following steps:
    check, with a user repository, of the existence and of the rights of a user associated with the identifier of the central control unit.

18. A method for configuring a central control unit belonging to a home automation installation, the method being implemented by the central control unit and comprising the following steps:
- obtainment of a location identifier of a first configuration remote service;
- sending a configuration request to the first configuration remote service using the location identifier of the first configuration remote service, the configuration request being linked to an identifier of the central control unit;
- reception, from the first configuration remote service, of at least one set of configuration data of the central control unit and of at least one identifier of a second functional remote service;
- configuration on the basis of the at least one set of configuration data of the central control unit and of the at least one identifier of a second functional remote service, wherein the at least one set of configuration data of the central control unit comprises an authorization of a use of determined communication protocols by the central control unit.

\* \* \* \* \*